(12) United States Patent
Kim et al.

(10) Patent No.: US 11,815,429 B2
(45) Date of Patent: Nov. 14, 2023

(54) PIN HOLE INSPECTION APPARATUS AND METHOD

(71) Applicant: SK Siltron Co., LTD., Gyeongsangbuk-do (KR)

(72) Inventors: Chang Rak Kim, Gyeongsangbuk-do (KR); Jin Ho Kang, Gyeongsangbuk-do (KR)

(73) Assignee: SK SILTRON CO., LTD., Gyeongsangbuk-do (KR)

( * ) Notice: Subject to any disclaimer, the term of this patent is extended or adjusted under 35 U.S.C. 154(b) by 65 days.

(21) Appl. No.: 17/752,171

(22) Filed: May 24, 2022

(65) Prior Publication Data
US 2023/0314270 A1   Oct. 5, 2023

(30) Foreign Application Priority Data

Apr. 1, 2022 (KR) .................. 10-2022-0041064

(51) Int. Cl.
*G01M 3/36* (2006.01)
(52) U.S. Cl.
CPC .................. *G01M 3/363* (2013.01)
(58) Field of Classification Search
CPC ................. G01M 3/36; G01M 3/363
See application file for complete search history.

(56) References Cited

FOREIGN PATENT DOCUMENTS

DE     102018109629 B4 *  5/2023  ............ F16L 59/065
KR     10-1991757         9/2019

\* cited by examiner

*Primary Examiner* — David Z Huang
(74) *Attorney, Agent, or Firm* — KED & ASSOCIATES, LLP

(57) ABSTRACT

Disclosed are a pin hole inspection apparatus and method for determining whether or not the vacuum-packed state of a Front Opening Shipping Box (FOSB) vacuum-packed with film paper is defective. The pin hole inspection apparatus includes a receiving unit configured such that the FOSB vacuum-packed with the film paper is received thereon and supported thereby, an adsorption unit vacuum-adsorbed onto a target part of the film paper, configured to surround the FOSB received on and supported by the receiving unit, so as to pull the film paper, a displacement measurement unit configured to measure a degree of swelling of the film paper pulled through the adsorption unit, and a processing unit configured to determine whether or not a pin hole is generated by comparing a measurement displacement value acquired through the displacement measurement unit with a pre-stored reference displacement value.

12 Claims, 8 Drawing Sheets

PIN HOLE INSPECTION APPARATUS AND METHOD

CROSS-REFERENCE TO RELATED APPLICATION

This application claims the benefit of Korean Patent Application No. 10-2022-0041064, filed on Apr. 1, 2022, which is hereby incorporated by reference as if fully set forth herein.

BACKGROUND OF THE INVENTION

Field of the Invention

The present invention relates to a pin hole inspection apparatus and method, and more particularly, to a pin hole inspection apparatus and method for determining whether or not the vacuum-packed state of a Front Opening Shipping Box (FOSB), which has been vacuum-packed with film paper, is defective.

Discussion of the Related Art

In order to deliver products to client companies after production of wafers, Front Opening Shipping Boxes (FOSBs) which have packed with film paper formed of aluminum should be packaged in a Hybox so as to be transported.

In general, most of operations of packing of the FOSBs and packaging of the FOSBs in the Hybox are performed manually by workers. Here, during a process of packing the FOSBs with the film paper or transferring the FOSBs packed with the film paper, there is a high possibility that a pin hole defect, such as pitting or tear of a packing part of the FOSB, occurs due to product interference or the like. That is, generation of a pin hole may cause a defect in the vacuum-packed state of the FOSB, a worker determines whether or not the vacuum-packed state of the FOSB is defective by inspecting whether or not a pin hole is generated with the naked eye, and thus, it is difficult to accurately determine whether or not the vacuum-packed state of the FOSB is defective.

Further, recently, interruption of work frequently occurs even in an automatic packaging system for Hyboxes due to a pin hole defect problem.

RELATED ART DOCUMENT

Patent Document (Patent Document 0001) Korean Patent Registration No. 10-1991757

SUMMARY OF THE INVENTION

Accordingly, the present invention is directed to a pin hole inspection apparatus and method that substantially obviate one or more problems due to limitations and disadvantages of the related art.

An object of the present invention is to provide a pin hole inspection apparatus and method configured to determine whether or not the vacuum-packed state of a Front Opening Shipping Box (FOSB), which has been vacuum-packed with film paper, is defective.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a pin hole inspection apparatus for determining whether or not a vacuum-packed state of a Front Opening Shipping Box (FOSB) vacuum-packed with film paper is defective includes a receiving unit configured such that the FOSB vacuum-packed with the film paper is received thereon and supported thereby, an adsorption unit vacuum-adsorbed onto a target part of the film paper configured to surround the FOSB, received on and supported by the receiving unit, so as to pull the film paper, a displacement measurement unit configured to measure a degree of swelling of the film paper pulled through the adsorption unit, and a processing unit configured to determine whether or not a pin hole is generated by comparing a measurement displacement value, acquired through the displacement measurement unit, with a pre-stored reference displacement value.

The receiving unit may include a tray configured such that the FOSB is received thereon, and alignment means configured to apply pressure to a circumferential part of the FOSB received on the tray so as to locate the FOSB at a regular position within the tray.

In another aspect of the present invention, a pin hole inspection apparatus for determining whether or not a vacuum-packed state of a Front Opening Shipping Box (FOSB) vacuum-packed with film paper is defective includes a transfer unit configured to transfer the FOSB, ports installed in a progress direction of the transfer unit, adsorption units installed in the ports and vacuum-adsorbed onto a target part of the film paper, configured to surround the FOSB located in the ports, so as to pull the film paper, displacement measurement units installed in the ports and configured to measure degrees of swelling of the film paper pulled through the adsorption units, and a processing unit configured to determine whether or not a pin hole is generated by comparing a measurement displacement value acquired through the displacement measurement units with a pre-stored reference displacement value.

The ports may be provided in plural, each of the adsorption units may be provided in a corresponding one of the ports, and the adsorption units may be configured such that each of the adsorption units is vacuum-adsorbed onto the target part of the film paper configured to surround the FOSB located in the corresponding one of the ports, and pulls the target part of the film paper at a set pressure for a set time.

Each of the displacement measurement units may be installed in a first port and a final port installed in the progress direction of the transfer unit, a first displacement value may be measured under a state in which a corresponding one of the adsorption units is vacuum-adsorbed onto the target part of the film paper in the first port, a second displacement value may be measured after the target part of the film paper is pulled at the set pressure for the set time under a state in which a corresponding another of the adsorption units is vacuum-adsorbed onto the target part of the film paper in the final port, and the measurement displacement value may be acquired from the first displacement value and the second displacement value.

In the pin hole inspection apparatus according to one aspect of the present invention and the pin hole inspection apparatus according to another aspect of the present invention, each of the adsorption units may include a cylinder installed in each of the ports and configured to be moved forwards and rearwards toward any one of five surfaces including four side surfaces of a circumferential part and an upper surface of the FOSB, a vacuum adsorption pad coupled to a front end of the cylinder, and a vacuum creation means connected to the vacuum adsorption pad so as to create a vacuum state in the vacuum adsorption pad or to release the vacuum state, and, wherein, when the cylinder is moved forwards, the vacuum adsorption pad may be adsorbed onto the target part of the film paper, the vacuum creation means may create the vacuum state in a coupling part between the vacuum adsorption pad and the film paper, and the cylinder may be moved rearwards at a set pressure for a set time so that the film paper is pulled rearwards by adsorptive power of the vacuum adsorption pad.

Further, each of the displacement measurement units may include a measurement plate formed at one side of the front end of the cylinder, and a displacement sensor configured to measure a displacement up to the measurement plate when the cylinder is moved forwards and the vacuum adsorption pad is adsorbed onto the target part of the film paper, and a displacement up to the measurement plate when the cylinder is moved rearwards at the set pressure for the set time and the film paper swells, and to transmit measured displacement values to the processing unit.

The adsorption unit and the displacement unit may be configured to be movable in at least any one of an X-axis direction or a Y-axis direction.

In yet another aspect of the present invention, a pin hole inspection method for determining whether or not a vacuum-packed state of a Front Opening Shipping Box (FOSB) vacuum-packed with film paper is defective includes aligning the FOSB vacuum-packed with the film paper through alignment means, swelling the film paper by pulling the film paper through an adsorption unit vacuum-adsorbed onto a target part of the film paper configured to surround the FOSB, measuring displacements by measuring degrees of swelling of the pulled film paper through a displacement measurement unit, and performing pin hole inspection by determining whether or not a pin hole is generated by comparing a measurement displacement value, acquired in the measuring the displacements, with a pre-stored reference displacement value.

The reference displacement value may be a displacement value acquired by measuring a degree of swelling of the film paper of the FOSB in a normal product state without a pin hole when the film paper is pulled.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
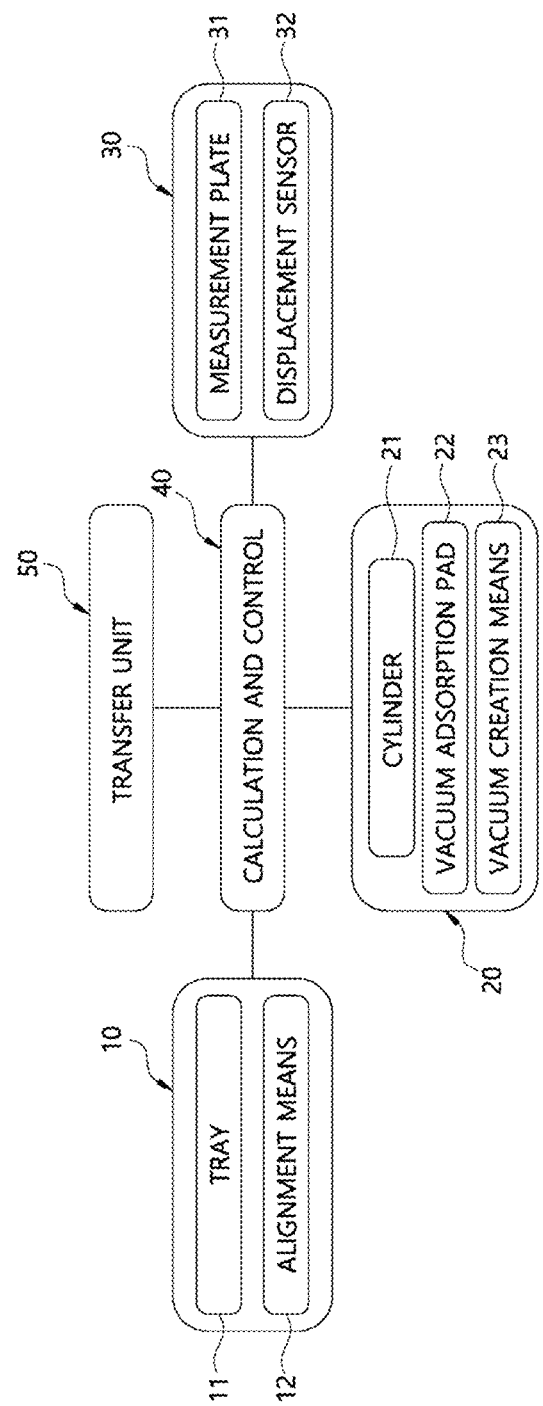
FIG. 1 is a block diagram of a pin hole inspection apparatus according to the present invention.

Hereinafter, embodiments of the present invention will be described in detail with reference to the accompanying drawings.

In the drawings, elements may be exaggerated in size, omitted, or illustrated schematically for convenience in description and clarity. Further, the sizes of elements do not indicate the actual sizes of the elements. Wherever possible, the same reference numerals will be used throughout the drawings to refer to the same parts.

Figure 2:
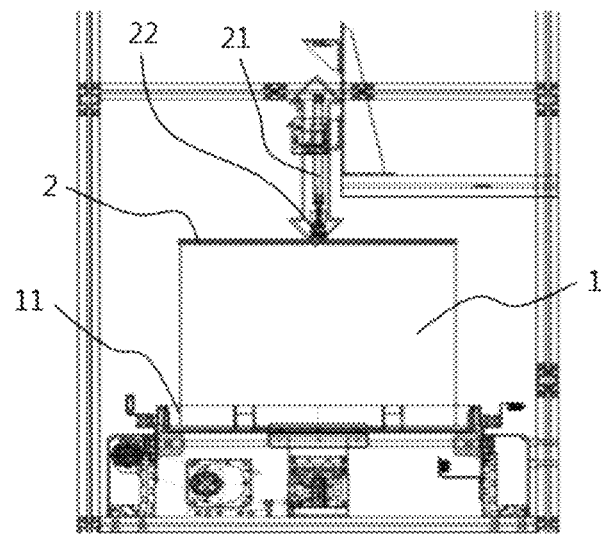
FIG. 2 is a front view conceptually illustrating the state in which a cylinder is moved forwards toward film paper surrounding the upper surface of an FOSB and is adsorbed onto the film paper using a vacuum adsorption pad in one embodiment of the pin hole inspection apparatus according to the present invention.
Figure 3:
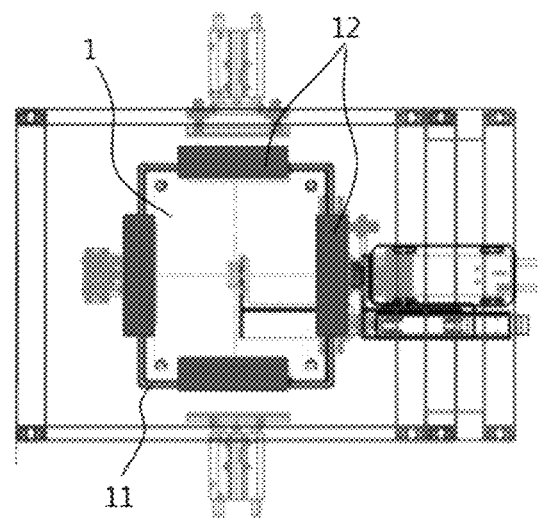
FIG. 3 is a plan view conceptually illustrating the configuration of a receiving part according to the present invention.
Figure 4:
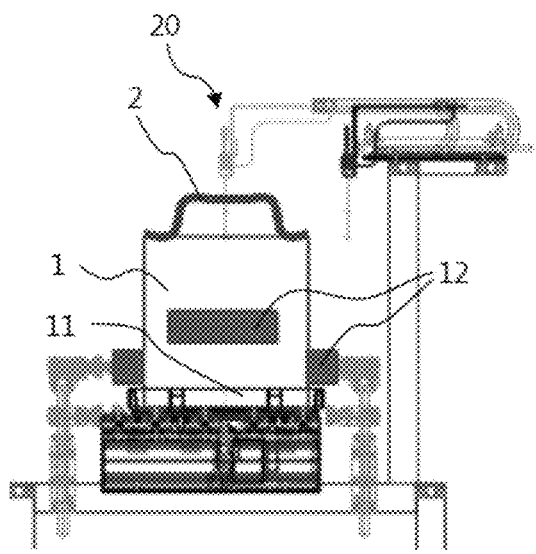
FIG. 4 is a side view conceptually illustrating the configuration of the receiving part according to the present invention.
Figure 5:
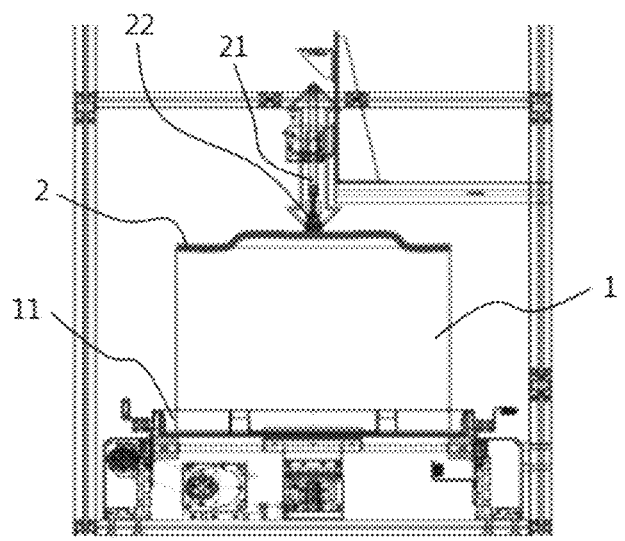
FIG. 5 is a front view conceptually illustrating the state in which the cylinder is moved rearwards so as to pull the film paper under the state shown in FIG. 2.
Figure 6:
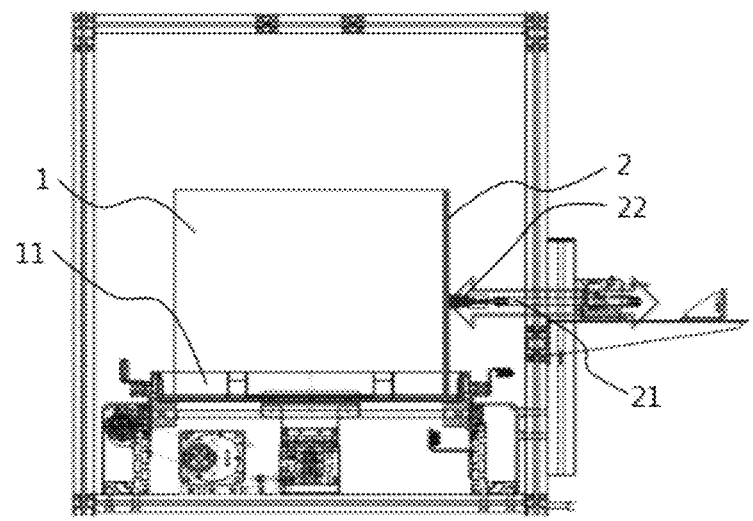
FIG. 6 is a front view conceptually illustrating the state in which the cylinder is moved forwards toward film paper surrounding any one side surface of the FOSB and is adsorbed onto the film paper using the vacuum adsorption pad in one embodiment of the pin hole inspection apparatus according to the present invention.
Figure 7:
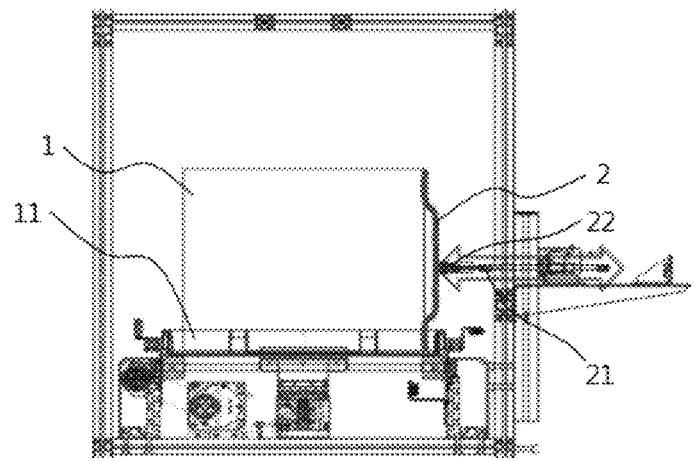
FIG. 7 is a front view conceptually illustrating the state in which the cylinder is moved rearwards so as to pull the film paper under the state shown in FIG. 6.

FIG. 1 is a block diagram of a pin hole inspection apparatus according to the present invention, FIG. 2 is a front view conceptually illustrating the state in which a cylinder is moved forwards toward film paper surrounding the upper surface of an FOSB and is adsorbed onto the film paper using a vacuum adsorption pad in one embodiment of the pin hole inspection apparatus according to the present invention, FIG. 3 is a plan view conceptually illustrating the configuration of a receiving part according to the present invention, FIG. 4 is a side view conceptually illustrating the configuration of the receiving part according to the present invention, FIG. 5 is a front view conceptually illustrating the state in which the cylinder is moved rearwards so as to pull the film paper under the state shown in FIG. 2, FIG. 6 is a front view conceptually illustrating the state in which the cylinder is moved forwards toward film paper surrounding any one side surface of the FOSB and is adsorbed onto the film paper using the vacuum adsorption pad in one embodiment of the pin hole inspection apparatus according to the present invention, and FIG. 7 is a front view conceptually illustrating the state in which the cylinder is moved rearwards so as to pull the film paper under the state shown in FIG. 6.

Referring to FIGS. 1 to 7, the configuration of one embodiment of the pin hole inspection apparatus according to the present invention will be described.

First, the pin hole inspection apparatus according to the present invention is an inspection apparatus for determining whether or not the vacuum-packed state of a Front Opening Shipping Box (FOSB) 1, which has been vacuum-packed with film paper 2, is defective.

The FOSB 1 in which wafers are stacked is vacuum-packed with the film paper 2 formed of aluminum. For example, the FOSB 1 may be an FOSB configured to pack 300 mm wafers. After the FOSB 1 has been vacuum-packed with the film paper 2, the FOSB 1 is loaded in a Hybox (not shown).

In this way, after the outer surface of the FOSB 1, in which products to be shipped to customers (wafers) are received, has been vacuum-packed using the packing film paper 2 formed of aluminum, the FOSB 1 is shipped and, in this case, a pin hole refers to the state in which pitting or tear of the film paper 2 occurs due to physical shock or interference applied to a vacuum packing part of the FOSB 1 from the outside. Therefore, an FOSB 1 on which a pin hole is generated is picked out through pin hole defect detection, and thus, it is possible to load the FOSB 1 in the pin hole defect state in a Hybox.

For this purpose, the pin hole inspection apparatus according to the present invention may include a receiving unit 10, an adsorption unit 20, a displacement measurement unit 30, and a processing unit 40.

The receiving unit 10 is a unit configured such that the FOSB 1 vacuum-packed with the film paper 2 is received thereon and supported thereby, and may include a tray 11 and alignment means 12. In the following description and the drawings, it is to be understood that the term 'FOSB' indicates the FOSB 1 which has been vacuum-packed with the film paper 2. The tray 11 may be understood as a shelf on which the FOSB 1 is received. The tray 11 may be formed to have a larger area than the area of a region in which the FOSB 1 is received. The alignment means 12 apply pressure to the circumferential part of the FOSB 1 received on the tray 11 so as to locate the FOSB 1 at a regular position within the tray 11, and the configuration shown in FIGS. 3 and 4 is referred to. That is, the alignment means 12 align the FOSB 1 on the upper surface of the tray 11 while supporting and applying pressure to four side surfaces of the FOSB 1 having a rectangular shape. In order to align the FOSB 1 by applying pressure to the four side surfaces of the FOSB 1, the alignment means 12 may use a cylinder which moves forwards or rearwards.

The adsorption unit 20 is vacuum-adsorbed onto a target part of the film paper 2 surrounding the FOSB 1, received on and supported by the receiving unit 10, so as to pull the film paper 2, and may include a cylinder 21, a vacuum adsorption pad 22 and a vacuum creation means 23. Here, the target part of the film paper 2 indicates a part of the film paper 2 onto which the vacuum adsorption pad 22 is adsorbed when the cylinder 21 is moved forwards.

The cylinder 21 may be configured to be moved forwards and rearwards toward any one of five surfaces including four side surfaces of the circumferential part and the upper surface of the FOSB 1. The vacuum adsorption pad 22 is coupled to the front end of the cylinder 21. When the cylinder 21 is moved downwards, as shown in FIG. 2, or is moved forwards, as shown in FIG. 6, the vacuum adsorption pad 22 coupled to the front end of the cylinder 21 is adsorbed onto the film paper 2. The vacuum adsorption pad 22 may have a hollow shape, such as a bell, and may be formed of a flexible material. Adsorptive power of the vacuum adsorption pad 22 may be increased or created adsorptive power may be released using the vacuum creation means 23 under the state in which the vacuum adsorption pad 22 is adsorbed onto the film paper 2 at a designated pressure. That is, the adsorptive power of the vacuum adsorption pad 22 may be increased by removing air from the inside of the vacuum adsorption pad 22 through the vacuum creation means 23, or the state of adsorbing the vacuum adsorption pad 22 onto the film paper 2 may be released by allowing air to flow into the vacuum adsorption pad 22, under the state in which the vacuum adsorption pad 22 is adsorbed onto the film paper 2. The adsorptive power of the vacuum adsorption pad 22 may be set to, for example, 80 kPa. Further, the forward or rearward moving pressure of the cylinder 21 may be set to, for example, 100 kPa.

That is, when the cylinder 21 is moved forwards (or moved downwards), the vacuum adsorption pad 22 is adsorbed onto the target part of the film paper 2. Under this state, the adsorption unit 20 creates a vacuum state in the coupling part between the vacuum adsorption pad 22 and the film paper 2 through the vacuum creation means 23, and then moves the cylinder 21 rearwards (or upwards) at a set pressure for a set time so that the film paper 2 is pulled rearwards by the adsorptive power of the vacuum adsorption pad 22.

Here, in a case in which there is no pin hole and in a case in which there is a pin hole, the pull length of the film paper 2 is varied. For example, the film paper 2 is kept tight and the film paper 2 is pulled by a length of 2 mm or less in the case in which there is no pin hole, and the vacuum state is released and thus the film paper 2 is pulled by a length exceeding 2 mm.

A degree of swelling of the film paper 2 pulled through the adsorption unit 20 may be measured by the displacement measurement unit 30. For this purpose, the displacement measurement unit 30 may include a measurement plate 31 and a displacement sensor 32.

The measurement plate 31 is formed at one side of the front end of the cylinder 21. The displacement sensor 32 serves to measure a displacement up to the measurement plate 31, and is formed at a fixed position. That is, the displacement sensor 32 measures a displacement up to the measurement plate 31 when the cylinder 21 is moved forwards and the vacuum adsorption pad 22 is adsorbed onto the target part of the film paper 2, and measures a displacement up to the measurement plate 31 when the cylinder 21 is moved rearwards at the set pressure for the set time and the film paper 2 swells. The respective measured displacement values are transmitted to the processing unit 40 which will be described later.

The processing unit 40 performs calculation using the displacement values, and determines whether or not a pin hole is generated by comparing a measurement displacement value acquired by the calculation with a pre-stored reference displacement value. That is, the processing unit 40 may acquire the measurement displacement value by performing the calculation using the displacement values received from the displacement sensor 32, and may determine the FOSB 1 as a normal product without a pin hole when the measurement displacement value is equal to or less than the reference displacement value, or may determine the FOSB 1 as a defective product with a pin hole when the measurement displacement value is greater than the reference displacement value. Therefore, the reference displacement value may be referred to as a displacement value acquired by measuring a degree of swelling of the film paper 2 of the FOSB 1 in a normal product state without a pin hole when the film paper 2 is pulled.

The adsorption unit 20 and the displacement measurement unit 30 may be configured to be movable in at least one of the X-axis direction or the Y-axis direction. That is, the positions of the adsorption unit 20 and the displacement measurement unit 30 may be adjusted depending on the size and position of the FOSB 1 and the position of the target part of the film paper 2.

Figure 8:
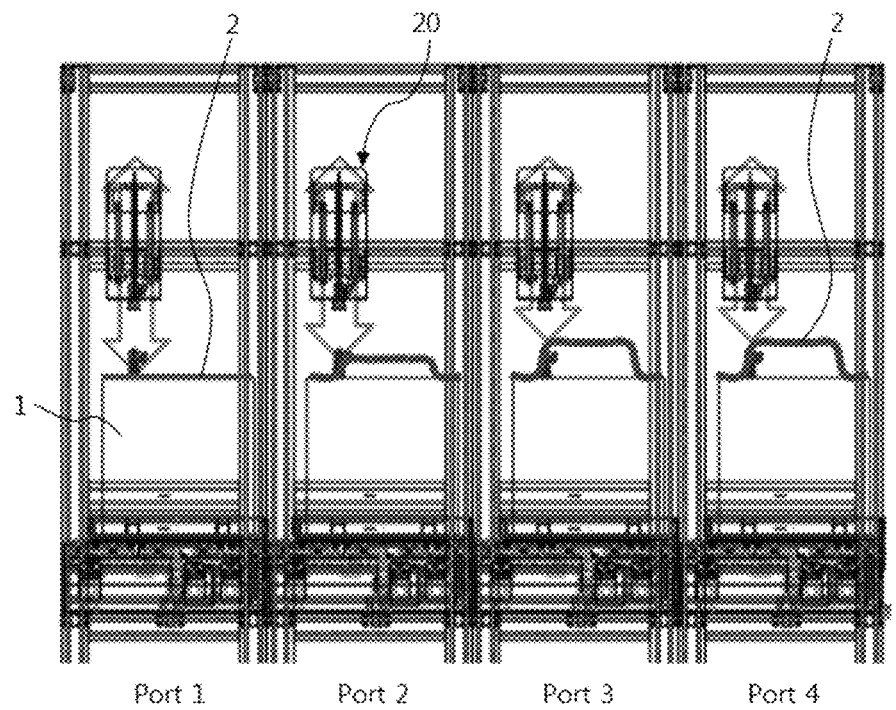
FIG. 8 is a side view conceptually illustrating the state in which, under the state in which a cylinder is moved forwards toward film paper surrounding the upper surface of an FOSB and is adsorbed onto the film paper using a vacuum adsorption pad, the cylinder pulls the film paper rearwards, in another embodiment of the pin hole inspection apparatus according to the present invention.
Figure 9:
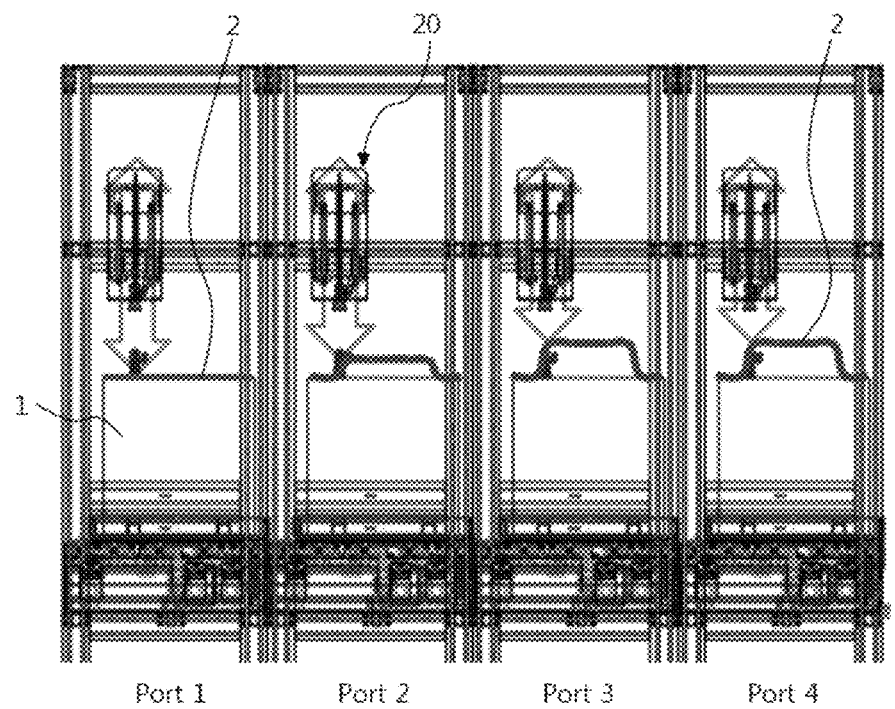
FIG. 9 is a plan view conceptually illustrating the state in which, under the state in which the cylinder is moved forwards toward film paper surrounding any one side surface of the FOSB and is adsorbed onto the film paper using the vacuum adsorption pad, the cylinder pulls the film paper rearwards, in another embodiment of the pin hole inspection apparatus according to the present invention.

FIG. 8 is a side view conceptually illustrating the state in which, under the state in which a cylinder is moved forwards toward film paper surrounding the upper surface of an FOSB and is adsorbed onto the film paper using a vacuum adsorption pad, the cylinder pulls the film paper rearwards, in another embodiment of the pin hole inspection apparatus according to the present invention, and FIG. 9 is a plan view conceptually illustrating the state in which, under the state in which the cylinder is moved forwards toward film paper surrounding any one side surface of the FOSB and is adsorbed onto the film paper using the vacuum adsorption pad, the cylinder pulls the film paper rearwards, in another embodiment of the pin hole inspection apparatus according to the present invention.

Another embodiment of the pin hole inspection apparatus according to the present invention has the same configuration as the earlier embodiment of the pin hole inspection apparatus, the configuration of another embodiment of the pin hole inspection apparatus is applied to an automation system, the basic configuration and operating state of another embodiment of the pin hole inspection apparatus are the same as those described with reference to FIGS. 1 to 7, and a detailed description thereof will thus be omitted.

Another embodiment of the pin hole inspection apparatus according to the present invention may include a transfer unit 50, ports 60, adsorption units 20, displacement measurement units 30, and a processing unit 40.

Although not shown in detail, the transfer unit 50 may employ all well-known transfer means configured to transfer products, and may employ, for example, a conveyer belt. It is to be understood that the transfer unit 50 may include the above-described receiving unit 10.

The plurality of ports 60 may be installed in the progress direction of the transfer unit 50. For example, the ports 60 may include four ports 60, i.e., Port 1-Port 4, and the adsorption unit 20 may be provided in each of the ports 60 so as to pull the film paper 2 at a set pressure for a set time.

Accordingly, the transfer unit 50 may be configured such that the FOSB 1 moves one port 60 at every set time. That is, under the state in which the adsorption unit 20 is adsorbed onto the film paper 2 surrounding the upper surface of the FOSB 1 or the film paper 2 surrounding one side surface of the FOSB 1 in Port 1, the film paper 2 is pulled upwards or rearwards for the set time, for example, 20 seconds, and then, the adsorbed state of the film paper 2 is released. The FOSB located in Port 1 is transferred to Port 2 by the transfer unit 50. Thereafter, in the same manner as in Port 1, under the state in which the adsorption unit 20 is adsorbed onto the film paper 2 surrounding the upper surface of the FOSB 1 or the film paper 2 surrounding the side surface of the FOSB 1, the film paper 2 is pulled upwards or rearwards for the set time, for example, 20 seconds, and then, the adsorbed state of the film paper 2 is released. The above-described operation is also performed in Port 3 and Port 4.

The displacement measurement unit 30 may be installed at each of the first port 60 and the final port 60 installed in the progress direction of the transfer unit 50. A first displacement value is measured under the state in which the adsorption unit 20 is vacuum-adsorbed onto the target part of the film paper 2 in the first port 60, i.e., Port 1, a second displacement value is measured by pulling the film paper 2 at the set pressure for the set time under the state in which the adsorption unit 20 is vacuum-adsorbed onto the target part of the film paper 2 in the final port 60, i.e., Port 4, and the first displacement value and the second displacement value are transmitted to the processing unit 40.

The processing unit 40 may acquire a measurement displacement value by performing calculation using the first displacement value and the second displacement value, and may determine whether or not a pin hole is generated by comparing the measurement displacement value acquired by the calculation with a pre-stored reference displacement value.

The adsorption unit 20 and the displacement measurement unit 30 may be coupled to a corresponding port 60 such that the adsorption unit 20 and the displacement measurement unit 30 are movable in at least one of the X-axis direction or the Y-axis direction.

Figure 10:
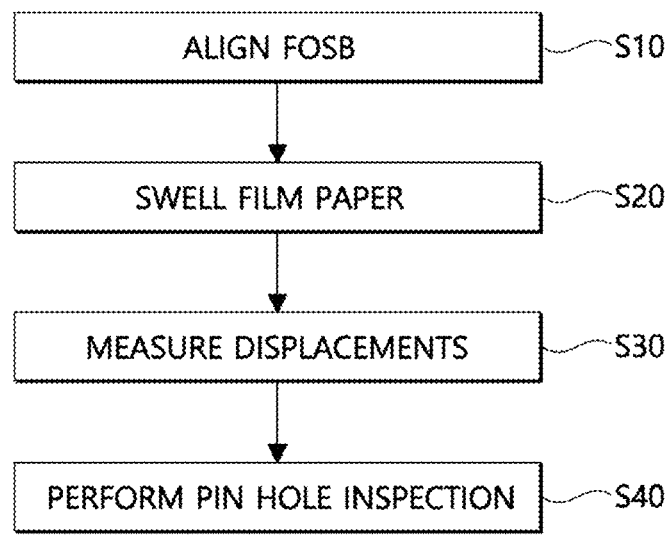
FIG. 10 is a flowchart representing a pin hole inspection method according to the present invention.
Figure 11:
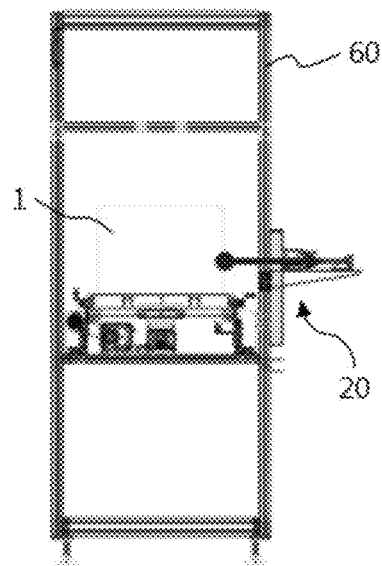
FIG. 11 is a conceptual view illustrating the state in which, after a cylinder is moved forwards toward film paper surrounding an FOSB according to the present invention and is adsorbed onto the film paper using a vacuum adsorption pad, a reference displacement value is checked.
Figure 12:
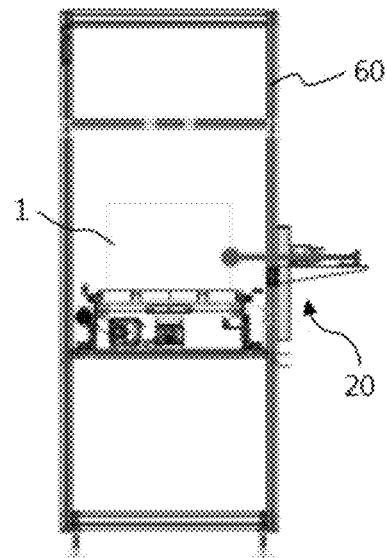
FIG. 12 is a conceptual view illustrating the state in which the cylinder is moved rearwards so as to pull the adsorbed film paper at a designated pressure under the state shown in FIG. 11.
Figure 13:
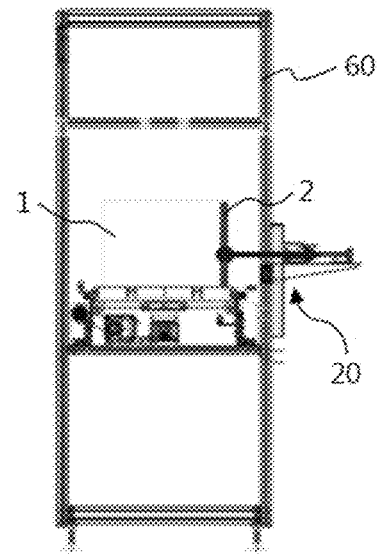
FIGS. 13 and 14 are conceptual views illustrating the state in which whether or not a pin hole is generated is determined through the pulled state of the film paper.
Figure 14:
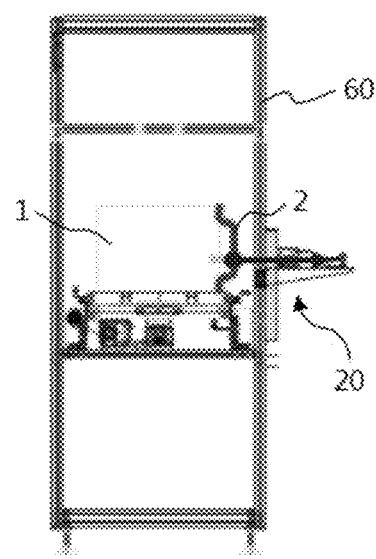

FIG. 10 is a flowchart representing a pin hole inspection method according to the present invention, FIG. 11 is a conceptual view illustrating the state in which, after a cylinder is moved forwards toward film paper surrounding an FOSB according to the present invention and is adsorbed onto the film paper using a vacuum adsorption pad, a reference displacement value is checked, FIG. 12 is a conceptual view illustrating the state in which the cylinder is moved rearwards so as to pull the adsorbed film paper at a designated pressure under the state shown in FIG. 11, and FIGS. 13 and 14 are conceptual views illustrating the state in which whether or not a pin hole is generated is determined through the pulled state of the film paper, more particularly, FIG. 13 shows an FOSB determined as a normal product, and FIG. 14 shows an FOSB determined as a defective product.

First, referring to FIG. 10, the pin hole inspection method according to the present invention is performed to determine whether or not the vacuum-packed state of a Front Opening Shipping Box (FOSB), which has been vacuum-packed with film paper, is defective, and may include aligning the FOSB (S10), swelling the film paper (S20), measuring displacements (S30), and performing pin hole inspection (S40). The pin hole inspection method will thus be described in brief because the above description of the configuration of the pin hole inspection apparatus may be referred to.

In the alignment of the FOSB (S10), the FOSB which has been vacuum-packed with the film paper is aligned through the alignment means, and any well-known alignment means may be applied, for example, the configuration of the above-described receiving unit 10 may be applied.

In the swelling of the film paper (S20), the adsorption unit is vacuum-adsorbed onto the target part of the film paper surrounding the FOSB, and pulls the film paper at a set pressure for a set time, and a well-known adsorption tool may be used, for example, the configuration of the above-described adsorption unit 20 may be applied.

In the measurement of the displacements (S30), degrees of swelling of the film paper are measured by the displacement measurement unit, and any well-known displacement measurement means may be applied, for example, the configuration of the above-described displacement measurement unit 30 may be applied.

In the performance of the pin hole inspection (S40), the processing unit determines whether or not a pin hole is generated by comparing a measurement displacement value acquired by calculation using displacement values, measured in the measurement of the displacements (S30), with a pre-stored reference displacement value, and the configuration of the above-described processing unit 40 may be applied.

In the pin hole inspection method according to the present invention, as shown in FIG. 11, a first displacement value may be acquired by measuring the position of the film paper 2 surrounding any one surface of the FOSB 1 using a laser displacement sensor. Thereafter, as shown in FIG. 12, the adsorption unit 20 is adsorbed onto the film paper 2 surrounding the surface of the FOSB 1, and then pulls the film paper 2 at a set pressure. Here, when the vacuum-packed state of the film paper 2 is good, a degree of stretching of the film paper 2 in the vacuum-adsorbed state by pulling is almost zero, or is very small, as shown in FIG. 13. On the other hand, when the vacuum-packed state of the film paper 2 is defective, the degree of stretching of the film paper 2 by pulling through the cylinder exceeds a designated value, as shown in FIG. 14. Therefore, the position of the film paper 2 stretched by the degree exceeding the designated value (i.e., a second displacement value) may be measured using the laser displacement sensor, the measurement displacement value may be acquired using the first displacement value and the second displacement value, and the FOSB may be determined as a normal product or a defective product having a pin hole by comparing the measurement displacement value with the a pre-stored reference displacement value.

As described above, the pin hole inspection apparatus and method according to the present invention may accurately determine whether or not the vacuum-packed state of an FOSB is defective through automatic pin hole inspection, compared to the conventional pin hole inspection method in which whether or not a pin hole is generated is inspected with the naked eye, and may realize zero defect leakage. Further, the pin hole inspection apparatus and method may automatically inspect and determine whether or not a pin hole is generated, thereby being capable of greatly improving operation efficiency compared to the conventional pin hole inspection method.

As is apparent from the above description, a pin hole inspection apparatus and method according to the present invention have the following effects.

First, the pin hole inspection apparatus and method according to the present invention may accurately determine whether or not the vacuum-packed state of an FOSB is defective through automatic pin hole inspection, compared to the conventional pin hole inspection method in which whether or not a pin hole is generated is inspected with the naked eye, and may realize zero defect leakage.

Further, the pin hole inspection apparatus and method according to the present invention may automatically inspect and determine whether or not a pin hole is generated, thereby being capable greatly reducing a time taken to perform inspection for confirming whether or not a pin hole is generated, compared to the conventional pin hole inspection method.

In addition, when the pin hole inspection apparatus and method according to the present invention are applied to a Hybox packaging automation system, overall operation efficiency may be greatly improved.

The features, structures, and effects described in association with the embodiments above are incorporated into at least one embodiment of the present invention, but are not limited only to the one embodiment. Furthermore, the features, structures, and effects exemplified in association with respective embodiments can be implemented in other embodiments by combination or modification by those skilled in the art. Therefore, content related to such combinations and modifications should be construed as falling within the scope of the present invention.

What is claimed is:

1. A pin hole inspection apparatus for determining whether or not a vacuum-packed state of a Front Opening Shipping Box (FOSB) vacuum-packed with film paper is defective, the pin hole inspection apparatus comprising:
   a receiving unit configured such that the FOSB vacuum-packed with the film paper is received thereon and supported thereby;
   an adsorption unit vacuum-adsorbed onto a target part of the film paper configured to surround the FOSB, received on and supported by the receiving unit, so as to pull the film paper;
   a displacement measurement unit configured to measure a degree of swelling of the film paper pulled through the adsorption unit; and
   a processing unit configured to determine whether or not a pin hole is generated by comparing a measurement displacement value, acquired through the displacement measurement unit, with a pre-stored reference displacement value.

2. The pin hole inspection apparatus according to claim 1, wherein the receiving unit comprises:
   a tray configured such that the FOSB is received thereon; and
   alignment means configured to apply pressure to a circumferential part of the FOSB received on the tray so as to locate the FOSB at a regular position within the tray.

3. The pin hole inspection apparatus according to claim 1, wherein the adsorption unit comprises:
   a cylinder configured to be moved forwards and rearwards toward any one of five surfaces comprising four side surfaces of a circumferential part and an upper surface of the FOSB;
   a vacuum adsorption pad coupled to a front end of the cylinder; and
   a vacuum creation means connected to the vacuum adsorption pad so as to create a vacuum state in the vacuum adsorption pad or to release the vacuum state,
   wherein, when the cylinder is moved forwards, the vacuum adsorption pad is adsorbed onto the target part of the film paper, the vacuum creation means creates the vacuum state in a coupling part between the vacuum adsorption pad and the film paper, and the cylinder is moved rearwards at a set pressure for a set time so that the film paper is pulled rearwards by adsorptive power of the vacuum adsorption pad.

4. The pin hole inspection apparatus according to claim 3, wherein the displacement measurement unit comprises:
   a measurement plate formed at one side of the front end of the cylinder; and
   a displacement sensor configured to measure a displacement up to the measurement plate when the cylinder is moved forwards and the vacuum adsorption pad is adsorbed onto the target part of the film paper, and a displacement up to the measurement plate when the cylinder is moved rearwards at the set pressure for the set time and the film paper swells, and to transmit measured displacement values to the processing unit.

5. A pin hole inspection apparatus for determining whether or not a vacuum-packed state of a Front Opening Shipping Box (FOSB) vacuum-packed with film paper is defective, the pin hole inspection apparatus comprising:
   a transfer unit configured to transfer the FOSB;
   ports installed in a progress direction of the transfer unit;
   adsorption units installed in the ports and vacuum-adsorbed onto a target part of the film paper, configured to surround the FOSB located in the ports, so as to pull the film paper;
   displacement measurement units installed in the ports and configured to measure degrees of swelling of the film paper pulled through the adsorption units; and
   a processing unit configured to determine whether or not a pin hole is generated by comparing a measurement displacement value acquired through the displacement measurement units with a pre-stored reference displacement value.

6. The pin hole inspection apparatus according to claim 5, wherein:
   the ports are provided in plural, and each of the adsorption units is provided in a corresponding one of the ports; and
   the adsorption units are configured such that each of the adsorption units is vacuum-adsorbed onto the target part of the film paper configured to surround the FOSB located in the corresponding one of the ports, and pulls the target part of the film paper at a set pressure for a set time.

7. The pin hole inspection apparatus according to claim 6, wherein:
   each of the displacement measurement units is installed in a first port and a final port installed in the progress direction of the transfer unit; and
   a first displacement value is measured under a state in which a corresponding one of the adsorption units is vacuum-adsorbed onto the target part of the film paper in the first port, a second displacement value is measured after the target part of the film paper is pulled at the set pressure for the set time under a state in which a corresponding another of the adsorption units is vacuum-adsorbed onto the target part of the film paper in the final port, and the measurement displacement value is acquired from the first displacement value and the second displacement value.

8. The pin hole inspection apparatus according to claim 5, wherein each of the adsorption units comprises:
   a cylinder installed in a corresponding one of the ports, and configured to be moved forwards and rearwards toward any one of five surfaces comprising four side surfaces of a circumferential part and an upper surface of the FOSB;
   a vacuum adsorption pad coupled to a front end of the cylinder; and
   a vacuum creation means connected to the vacuum adsorption pad so as to create a vacuum state in the vacuum adsorption pad or to release the vacuum state,
   wherein, when the cylinder is moved forwards, the vacuum adsorption pad is adsorbed onto the target part of the film paper, the vacuum creation means creates the vacuum state in a coupling part between the vacuum adsorption pad and the film paper, and the cylinder is moved rearwards at a set pressure for a set time so that the film paper is pulled rearwards by adsorptive power of the vacuum adsorption pad.

9. The pin hole inspection apparatus according to claim 8, wherein each of the displacement measurement units comprises:
   a measurement plate formed at one side of the front end of the cylinder; and
   a displacement sensor configured to measure a displacement up to the measurement plate when the cylinder is moved forwards and the vacuum adsorption pad is adsorbed onto the target part of the film paper, and a displacement up to the measurement plate when the cylinder is moved rearwards at the set pressure for the set time and the film paper swells, and to transmit measured displacement values to the processing unit.

10. The pin hole inspection apparatus according to claim 1, wherein the adsorption unit and the displacement unit are configured to be movable in at least any one of an X-axis direction or a Y-axis direction.

11. A pin hole inspection method for determining whether or not a vacuum-packed state of a Front Opening Shipping Box (FOSB) vacuum-packed with film paper is defective, the pin hole inspection method comprising:
    aligning the FOSB vacuum-packed with the film paper through alignment means;
    swelling the film paper by pulling the film paper through an adsorption unit vacuum-adsorbed onto a target part of the film paper configured to surround the FOSB;
    measuring displacements by measuring degrees of swelling of the pulled film paper through a displacement measurement unit; and
    performing pin hole inspection by determining whether or not a pin hole is generated by comparing a measurement displacement value, acquired in the measuring the displacements, with a pre-stored reference displacement value.

12. The pin hole inspection method according to claim 11, wherein the reference displacement value is a displacement value acquired by measuring a degree of swelling of the film paper of the FOSB in a normal product state without a pin hole when the film paper is pulled.

* * * * *